March 10, 1942.  L. T. STAFFORD  2,275,695
AUTOMOBILE CHANGE SPEED INDICATOR
Filed Jan. 29, 1940
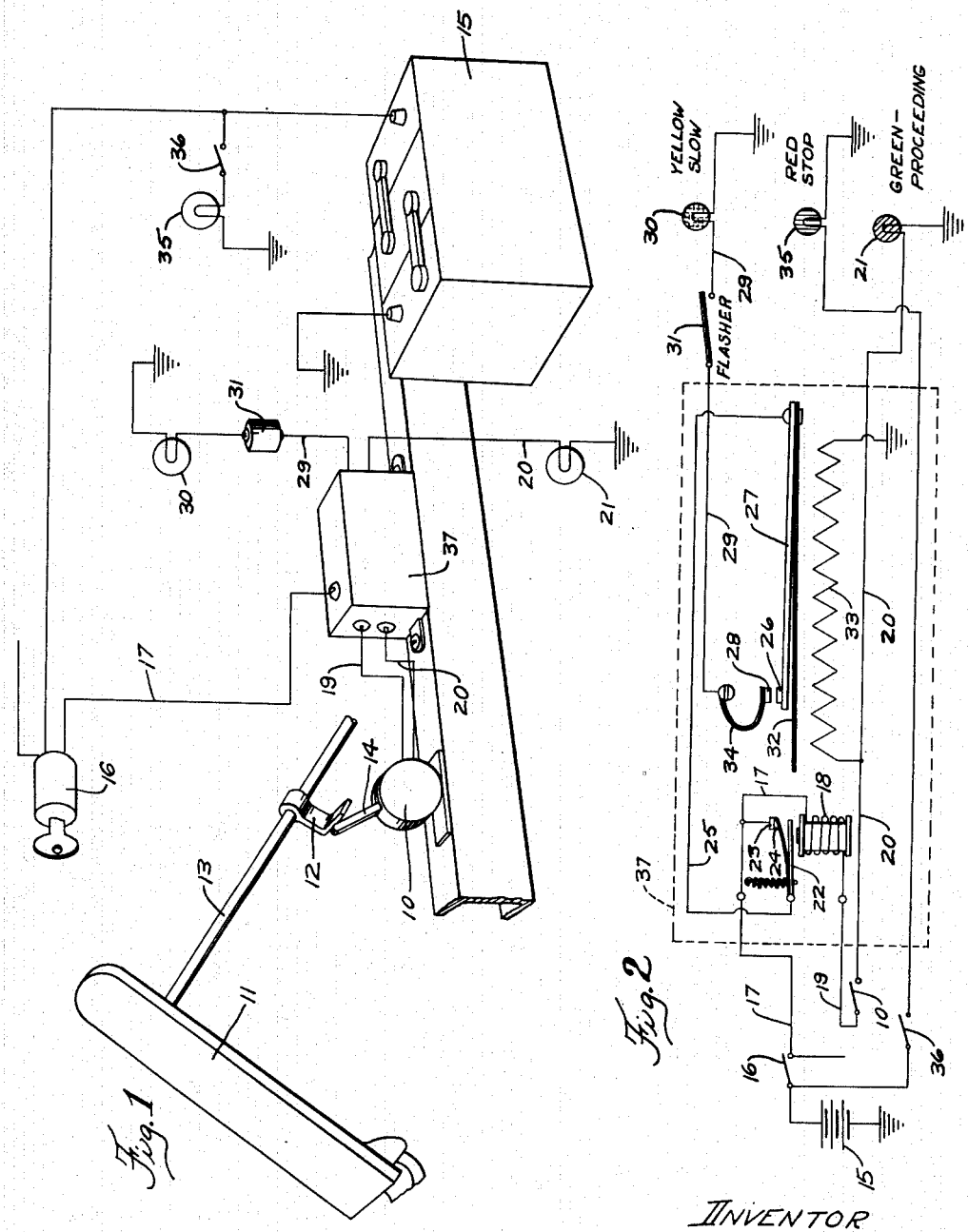
INVENTOR
LAWRENCE T. STAFFORD,
By Minturn & Minturn,
ATTORNEYS Patented Mar. 10, 1942

2,275,695

UNITED STATES PATENT OFFICE 2,275,695

AUTOMOBILE CHANGE SPEED INDICATOR

Lawrence T. Stafford, Indianapolis, Ind.

Application January 29, 1940, Serial No. 316,286

1 Claim. (Cl. 177—339)

This invention relates to means for indicating to approaching or following vehicles a change in speed of a vehicle by visible signals incorporated in a simple and unique structure operating automatically in response to the change in position of a speed control member. The invention further incorporates a time delay feature which automatically retains a signal in operating condition for a short length of time following breaking of an electric circuit normally energizing that signal so that the signal may, following that delay period, eventually assume a non-indicating condition.

These and other features of the invention will become apparent to those versed in the art in the following description of one particular form of the invention as illustrated diagrammatically in the accompanying drawing, in which Fig. 1 is a diagrammatic representation of the invention as applied to an automobile; and Fig. 2, a wiring diagram.

Like characters of reference indicate like parts in the two views in the drawing.

The modern automobile is now customarily equipped with a stop light universally red in color. This stop light is operated upon depression of a brake pedal. Therefore this signal is one displayed following application of the brakes on the vehicle. Another condition arises, however, that concerns the safety of operation upon the highways, particularly in night driving. One vehicle may be following another vehicle. The leading vehicle may for some reason or other slacken its speed without the brakes being applied and the following vehicle would have no knowledge of that fact, particularly when the leading vehicle is some little distance ahead of the following vehicle. This reduction in speed would normally occur when the operator of the leading vehicle would lift his foot to allow the foot throttle pedal to return to a predetermined position.

My invention is designed to signal not only that lowering of speed but also to indicate when the leading vehicle is moving ahead at an approximately constant speed or at an increasing speed, the latter condition, of course, not entering into the question of safety, particularly in relation to the following vehicle. In general the result of my invention is that when the vehicle is standing still, the customary lights may be displayed without other signals. Then upon the vehicle being set in motion, a signal becomes visible, such as a green light, or if preferred, any other color such as blue, to indicate that the vehicle is underway. Another signal, such as a yellow light, becomes visible when the vehicle starts to slow down independently of brake application or even in conjunction therewith.

In the form of the invention herein shown, I employ a switch 10 which is normally held open when the foot throttle pedal 11 is in its extreme upper position. Then when the pedal 11 is pressed, particularly in its initial movement, the switch 10 is permitted to actuate by that initial travel to a closed position and remains closed until the pedal 11 returns into that range of initial travel when the switch is again opened. The particular construction of this switch does not enter into my invention but should be of that design whereby it may be readily operated in conjunction with the travel of the pedal 11 by any suitable means such as by a bracket 12 herein shown as being on a throttle connecting rod 13 being moved out of the path of an arm 14 which serves to hold the switch 10 open normally in the manner above indicated.

Electric current is supplied in the usual manner from the vehicle storage battery 15. A circuit is established from the battery 15 through the usual ignition control switch 16 by a wire 17 to the winding 18 of an electro-magnet, a wire 19 leading to the switch 10, and a wire 20 leading to the green or "proceeding" lamp 21 and thence back to the battery 15 by any suitable means, such as a ground return through the vehicle framework. Thus when the switches 16 and 10 are closed, the lamp 21 is energized and gives the signal that the vehicle is proceeding normally. Also when those switches 16 and 10 are closed, the winding 18 is energized and an armature 22 is shifted to open a circuit at the contacts 23, connected to the wire 17, and 24, carried by the armature 22 and interconnected with the wire 25 which in turn is connected to the contact 26 through the bar 27. The contact 26 is initially spaced from an opposing contact 28 which in turn is connected to the wire 29 with the yellow or "reducing speed" indicating lamp 30 and a return to the battery 15 herein shown as a ground connection. In the wire 29 is preferably placed a "flasher" 31 of any suitable type that operates to make and break the circuit automatically upon flow of current through the wire 29 so as to give the lamp 30 a flashing effect. The ordinary commercially obtainable flasher unit, herein indicated by the numeral 31, may be employed for this purpose.

The bar 27 is mounted in conjunction with a length of bimetal 32 that is mounted in proximity to a heating coil or winding 33 so that when the coil 33 is energized, the bimetal 32 will be heated thereby and assume a bowed condition to carry the contact 26 against the contact 28 but in the operation so far described, no circuit will be completed thereby to include the lamp 30 by reason of the fact that the contact members 23 and 24 have been separated by the electro-magnet 18. The resistance unit 33 is energized simultaneously with the flow of current to the lamp 21 since this unit 33 is shown as connected in the circuit therewith, herein shown as in parallel circuit, the exact nature of the circuit being immaterial so long as this resistance unit 33 is energized when the switches 16 and 10 are closed.

As indicated in Fig. 2, while not absolutely necessary, it may be advisable to employ a compensating bimetal member 34 in order to vary the position of the contact member 28 in accordance with atmospheric temperature variations to accommodate possible variations in travel of the bimetal strip 32 due to such temperature variations.

Now should the vehicle operator allow the pedal 11 to lift and come within that initial travel range to permit the switch 10 to open, the vehicle speed will, of course, correspondingly decrease and the circuit will be broken through the magnetic winding 18, the resistance unit 33 and the green lamp 21. This circuit interruption will permit the contact members 23 and 24 to return to their normal contacting condition since the armature 22 is biased to normally maintain that condition. When those two members 23 and 24 come together, a circuit is then completed to include the yellow lamp 30 since the contact members 26 and 28 will remain closed for a period of time following de-energization of the resistance unit 33—this period of time being that required for the bimetal strip 32 to cool off and return to its position permitting separation of the contact members 26 and 28. It is, of course, desirable that the yellow lamp eventually go off automatically since it is not required for a signal when the vehicle eventually comes to a stop. The foregoing action, of course, takes place entirely independent of the display of the usual red signal lamp 35 operated through its control switch 36 by the usual brake pedal action.

While I have above referred to the lamps 21 and 30 being green and yellow respectively, it is obvious that other colors may be employed as may be found to be desirable although the yellow color is customarily employed to indicate caution. Where the green light is found to be objectionable in certain localities when displayed on the rear end of the vehicle, the color may be changed, of course, to white or blue or the like to meet the local requirements.

In practice the electro-magnet 18 and the bimetal 32 with its resistance unit 33 and the accompanying contact members 26 and 28 may all be located within one relatively small enclosing member 37 for convenience in mounting. When this is done, it is an extremely simple matter to install the invention on any vehicle by then running the wires to form the circuits as indicated in the drawing.

While I have herein shown and described my invention in the one precise form, it is obvious that structural changes may be employed without departing from the spirit of the invention and I, therefore, do not desire to be limited to that precise form beyond the limitations as may be imposed by the following claim.

I claim:

In a vehicle change-in-speed indicator operated by travel of a vehicle fuel control member, a caution signal, a main signal control switch actuated by said fuel control member, a source of electrical energy, an electro-magnet, a heating unit, an electrical circuit including said energy source, control switch, magnet, and heating unit, an interrupting switch associated with said electro-magnet normally biased to a closed position and shiftable to an open position by said magnet upon energization thereof, a thermostatic switch associated with said heating unit normally biased to an open condition and closed upon energization of said unit, and a second circuit including said energy source, interrupting switch, said thermostatic switch, and said signal, whereby closure of said main control switch closes said first circuit and opens said second circuit by opening said interrupting switch, and subsequent opening of said main switch causes closing of said second circuit which remains closed until said thermostatic switch opens upon cooling of said heating unit.

LAWRENCE T. STAFFORD.